United States Patent [19]

Hayashi

[11] 4,453,906

[45] Jun. 12, 1984

[54] APPARATUS FOR CONTINUOUSLY DISCHARGING DOUGH TO PRODUCE A WEB OF DOUGH SHEET

[76] Inventor: Torahiko Hayashi, 3-4, Nozawa-machi, Utsunomiya-shi, Tochgiken, Japan

[21] Appl. No.: 404,469

[22] Filed: Aug. 2, 1982

[30] Foreign Application Priority Data

Aug. 1, 1981 [JP] Japan .................................. 56-122736

[51] Int. Cl.³ ........................... A21C 3/04; B29D 7/02
[52] U.S. Cl. ..................................... 425/224; 425/471
[58] Field of Search ............... 425/223, 224, 279, 324, 425/363, 377, 461, 306, 280, 281, 284, 291, 301, 306, 311, 316, 471

[56] References Cited

U.S. PATENT DOCUMENTS

| | | | |
|---|---|---|---|
| 1,949,105 | 2/1934 | Lauterbur et al. | 426/496 |
| 1,975,326 | 10/1934 | Loose et al. | 426/502 |
| 2,579,527 | 12/1951 | Weyerhaeuser | 425/582 |
| 2,594,342 | 4/1952 | Pettyjohn | 198/822 |
| 2,662,665 | 12/1953 | Harper | 198/616 |
| 2,756,459 | 7/1956 | Kellner | 425/224 |
| 2,888,886 | 6/1959 | Jorgenson et al. | 425/224 |
| 2,981,996 | 5/1961 | Peavey | 425/377 |
| 3,169,633 | 2/1965 | Baker | 198/823 |
| 3,374,751 | 3/1968 | Werner | 198/823 |
| 3,889,802 | 6/1975 | Jonkers | 198/823 |

FOREIGN PATENT DOCUMENTS

| | | | |
|---|---|---|---|
| 273813 | 8/1969 | Austria | 198/557 |
| 180176 | 1/1907 | Fed. Rep. of Germany | 425/223 |
| 182006 | 1/1956 | Sweden | 425/363 |

*Primary Examiner*—Willard E. Hoag
*Attorney, Agent, or Firm*—Guy W. Shoup; Gerard F. Dunne

[57] ABSTRACT

An apparatus for continuously discharging dough through a gap or exit (9; 109) to produce a web of dough sheet (15; 115). Dough (16; 116) supplied in a hopper (1; 101) is advanced by a conveying mechanism (2; 103) serving as the moving bottom wall of the hopper toward said exit which is provided at a lower portion of a side wall of the hopper, said exit (9; 109) being defined between a part of said conveying mechanism and the upper end of the exit, a cutter (10; 110) being provided at the upper end of the exit, a cutter (10; 110) being provided at the upper end of the exit so as to be directed inwardly of the hopper. Thus, dough can be smoothly discharged through said exit without jamming it.

6 Claims, 7 Drawing Figures

APPARATUS FOR CONTINUOUSLY DISCHARGING DOUGH TO PRODUCE A WEB OF DOUGH SHEET

The present invention relates to an apparatus for continuously discharging dough through a gap or exit of a hopper to produce a web of dough sheet.

The invention is very effective when used for discharging soft dough material in a state where it constitutes an integral mass with gluten tissue being well developed, such as bread dough obtained by kneading flour with water.

Conventionally, dough is passed through a gap between a pair of rolls to produce a web of dough sheet. However, the types of dough materials which can be processed by the conventional devices were very limited, and even in those cases where suitable types of dough can be processed, the dough sheets thus obtained are often highly uneven in thickness or texture. This results mainly because portions of the dough approaching the gap between the rollers generate a turbulent flow, increasing stress in the dough portions.

An object of the present invention is to resolve the above difficulty and to provide an apparatus having, at the upper inner end of the exit of a dough hopper, a cutter directed backwardly thereof, thereby to divide the dough approaching the exit into two portions and causing them to move in upper and lower directions. The lower portion of the dough is readily advanced beyond the exit to be conveyed a subsequent conveyor or station for further processing, while the upper portion of the dough is easily deflected upwardly, thus the clogging of the exit by excessive dough is prevented.

According to the present invention, there is provided an apparatus for continuously discharging dough through a gap or exit to produce a web of dough sheet, characterized by a hopper having peripheral side walls for receiving dough to be supplied therein, said exit being provided at a lower portion of one of said side walls. A conveying mechanism a part of which is adapted to serve as the bottom wall of said hopper, and a cutter a provided at the upper inner end of said exit so as to be directed inwardly of the hopper and positioned opposite to and substantially parallel to a portion of said part of the conveying mechanism, said part of the conveying mechanism being adapted to be continuously moved in the direction opposite that of the inwardly facing cutter.

The conveying mechanism may comprise a single endless flat conveyor belt, a portion of the upper run of which serves as the bottom wall of said hopper. In this case, said conveyor belt may be adapted to have a U-shaped cross-section opening outwardly with the aid of suitable means, at least when serving as the bottom wall of said hopper, so that such U-shaped cross-sectional belt can effectively discharge a fixed amount of dough, since the width of dough sheet is substantially defined thereby.

To attain the same effect, the conveying mechanism may comprise, in addition to said single flat conveyor belt, two endless flat conveyor belts parallel to each other and positioned vertically of, and closely adjacent, both sides of the upper run of the first-mentioned conveyor belt.

Alternatively, the conveying mechanism may comprise a plurality of U-shaped elements or feed plates arranged side by side to form an endless loop.

The cutter in the present invention may comprise a stationary blade mounted on a side wall of the hopper and a movable blade which is adapted to co-operate with said stationary blade to sever dough. These blades are preferably serrate to ensure effective severing of dough.

For a better understanding of the invention, reference will now be made by way of embodiments thereof to the accompanying drawings, in which.

Figure 1:
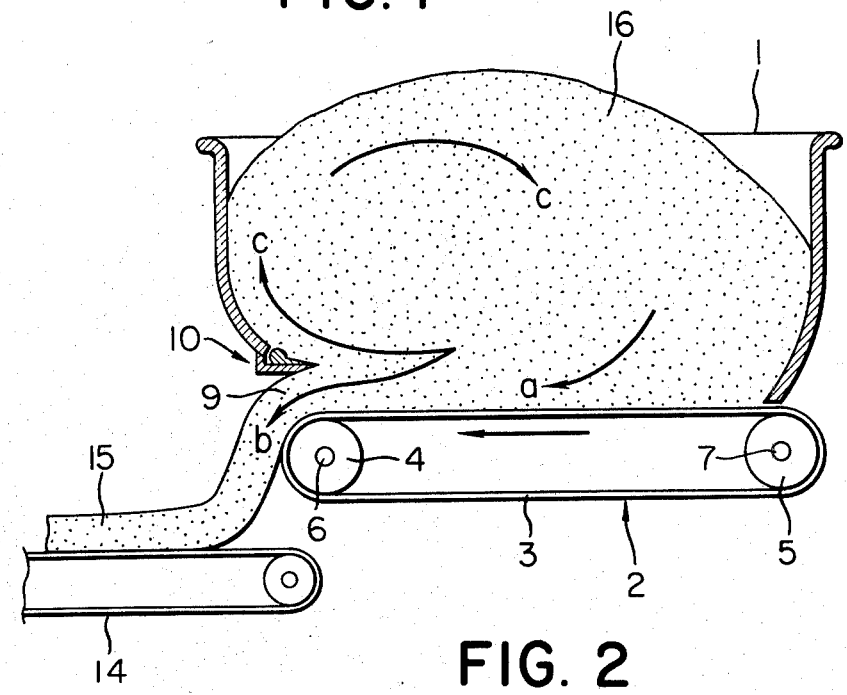
FIG. 1 is a schematically cross-sectional side view of an embodiment of an apparatus in accordance with the present invention.
Figure 2:
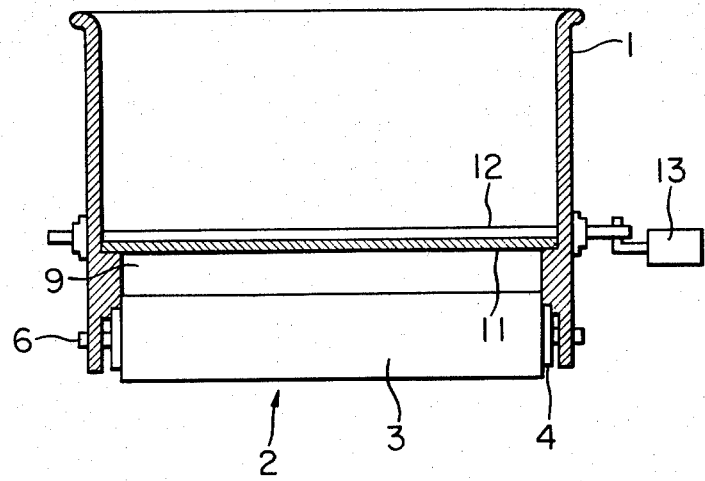
FIG. 2 is a schematically cross-sectional end view of the embodiment shown in FIG. 1.

In FIGS. 1 and 2, a hopper (1) receives dough (16). It is provided at the bottom portion thereof with a conveying mechanism (2) comprising a pair of rolls (4) and (5) and an endless flat conveyor belt (3) looped around the rolls (4) and (5). The shafts (6) and (7) of the rolls (4) and (5), respectively, are mounted on the peripheral side walls of the hopper (1) so as to be freely rotated about their axes by a motor not shown. A part of the upper run of the belt (3) forms the bottom wall of the hopper (1), and the side edges of the belt (3) are closely adjacent to the peripheral side walls of the hopper (1).

A gap or exit (9) is provided at a lower portion of a side wall of the hopper (1) so as to be defined between the upper end of the exit and a portion of the upper run of the belt (3). A cutter (10) is provided at or adjacent the upper end of the exit (9) so as to be directed inwardly of the hopper and positioned opposite to and substantially parallel to said portion of the upper run of the belt (3). It should be noted that said upper run of the belt (3) is continuously movable in the opposite direction to that in which the blades extend from said cutter (10).

Figure 3:
FIG. 3 is a plan view of an example of the movable blade of the cutter to be secured to the apparatus.
Figure 4:
FIG. 4 is a plan view of an example of the stationary blade of the cutter.
Figure 5:
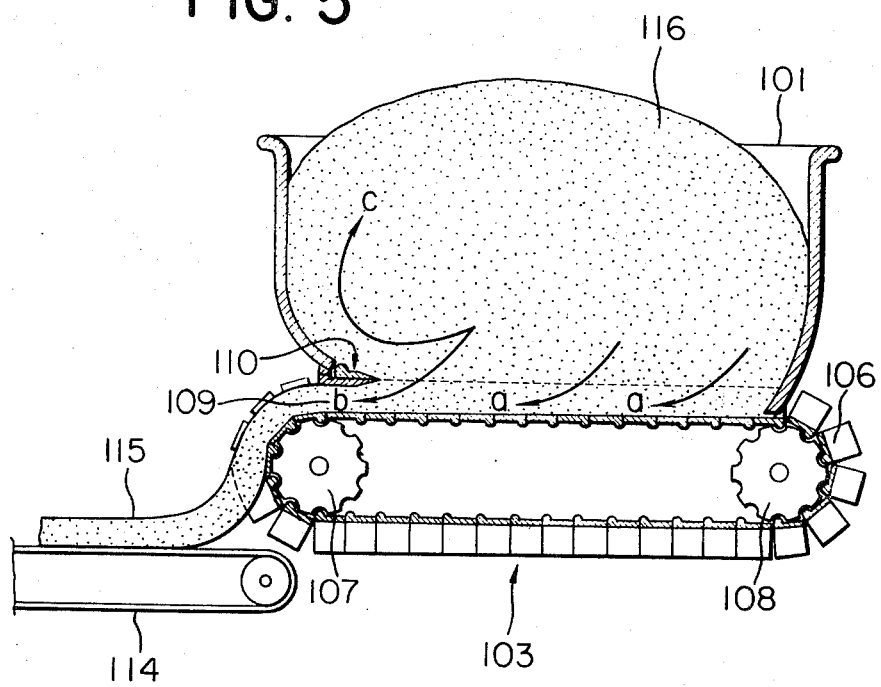
FIG. 5 is a schematically cross-sectional side view of another embodiment of an apparatus in accordance with the present invention.
Figure 6:
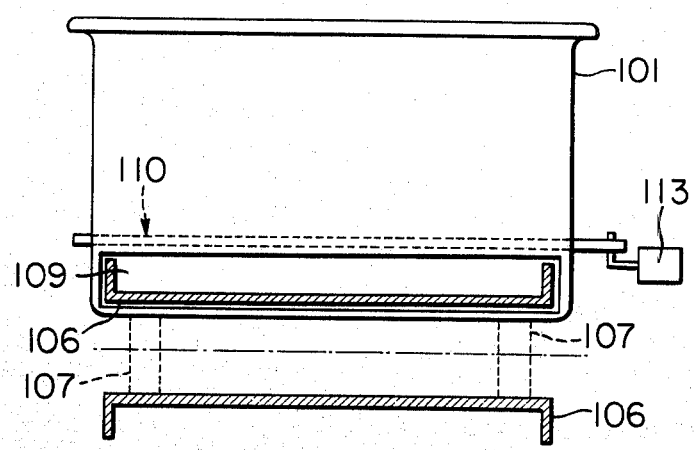
FIG. 6 is a schematically cross-sectional end view of the embodiment shown in FIG. 5.
Figure 7:
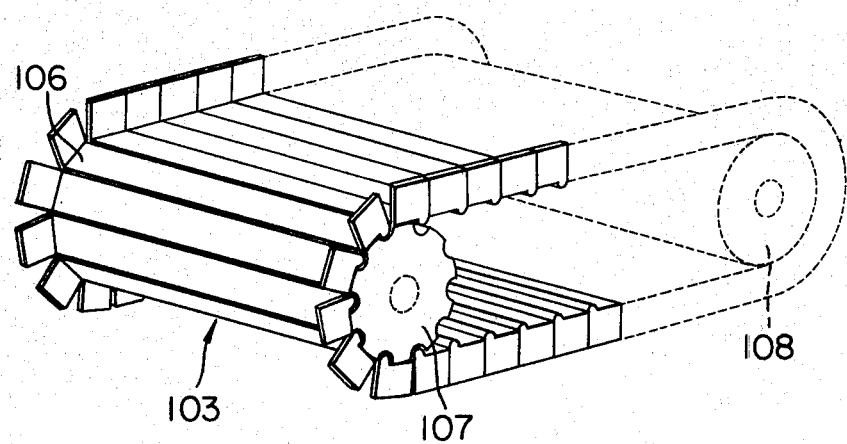
FIG. 7 is a perspective view, partially shown in dotted lines, of a conveying mechanism used in the embodiment shown in FIGS. 5 and 6.

The cutter (10) comprises a stationary blade (11) secured to the side wall of the hopper (1) by suitable means and a movable blade (12) arranged side by side with and in co-operative relation with said stationary blade (11) to sever the dough. The stem holding the movable blade (12) passes through a pair of opposing side walls of the hopper (1) at a hole provided in each said side wall and is made to oscillate by a motor (13). Both of the blades are preferably serrate, as shown in FIGS. 3 and 4, to effectively sever the dough when the movable blade (12) oscillates.

In another embodiment of an apparatus according to the present invention, a conveying mechanism (103) comprises a plurality of U-shaped elements or feed plates (106) arranged side by side to form an endless loop. Each U-shaped element has a small protrusion to mesh with gears (107) and (108). The loop of the U-shaped elements is wound around these gears (107) and (108). The shafts of the gears are both mounted on a frame of the apparatus so as to freely rotate about their axes by a motor not shown. While passing through the hopper (101), the plurality of feed plates (106) come into contact with each other to form a tray having a certain width within the hopper (101) thereby to define the width of a dough sheet to be discharged. The thickness of the finished dough sheet is defined between the upper end of an exit (109), which is provided at a lower portion of a side wall of the hopper (101) and through which the conveying mechanism (103) passes, and the bottom wall of a plate (106) when the conveying mechanism (103) passes through the exit (109). Thus, substantially a fixed mount of dough can be discharged. In this connection, it should be noted that the structure and function of the cutter (110) may be the same as those illustrated in the previous embodiment.

In operation, adequately soft dough, such as bread dough, (16; 116) is continuously supplied in the hopper (1;101) to ride on the conveying mechanism (2; 103). Specifically in the first embodiment, the upper run of the conveyor belt (3), or in the second embodiment a tray formed within the hopper (101) by the multiple U-shaped feed plates (106) while the conveying mechanism (103) is run through the hopper. The lower portion of the dough (16; 116) will be advanced by the conveying mechanism (2; 103) toward the exit (9; 109) as shown by the arrow (a) and will be discharged through the exit as shown by the arrow (b). A part of the dough, however, will be separated by the cutter (10; 110) from the dough to be discharged to deflect upwardly as shown by the arrow (c) without jamming the exit. Thus, the dough can be stably discharged out of the apparatus.

In case the cutter (10; 110) was not provided at the upper end of the exit (9; 109), the dough (16; 116) approaching the exit would be substantially and entirely deflected in the direction of the arrow (c) and only a small amount of dough would be moved in the direction of the arrow (b) in an irregular flow. This is because the dough in which gluten tissue is well developed to from an integral mass would increase inner stress in the vicinity of the exit, since the movement of the dough would be hindered by the exit (9; 109) having an opening of restricted dimensions. Experiments have clarified that no stable discharge was obtained.

When the conveying mechanism (103) in the second embodiment is used, it has been found that dough compositions with a greater range of component variations can be continuously discharged with substantially a fixed rate in comparison with dough effectively applied to the conveying mechanism (2) in the first embodiment.

The dough discharged from the exit (9; 109) is continuously transformed into a web of dough sheet (15; 115) and is guided around an end of the conveying mechanism (2; 103) onto a receiving conveyor (14; 114) positioned below the exit (9; 109).

Although the preferred embodiments of the present invention have been illustrated and described, it will be apparent to those skilled in the art that various changes and alternations may be made without departing from the spirit of the invention.

I claim:

1. An apparatus for continuously discharging dough through a gap to produce a web of dough sheet, characterized by a hopper having peripheral side walls, for receiving dough to be supplied therein, said gap being provided at a lower portion of one of said side walls, a conveying mechanism a part of which is adapted to serve as the bottom wall of said hopper, and a cutter provided at the upper inner end of said gap so as to be directed inwardly of the hopper and positioned opposite to and substantially parallel to a portion of said part of the conveying mechanism, said part of the conveying mechanism being adapted to be moved in the direction opposite that of said inwardly directed cutter, said cutter comprises a stationary blade secured to a side wall of said hopper and a movable blade adapted to co operate with said stationary blade to sever dough.

2. An apparatus according to claim 1, in which said conveying mehanism comprises an endless flat conveyor belt, a portion of the upper run of which serves as the bottom wall of said hopper.

3. An apparatus according to claim 2, in which said conveying belt is adapted to take a U-shaped cross-section opening outwardly, at least when serving as the bottom wall of said hopper.

4. An apparatus according to claim 2, in which said conveying mechanism further comprises two endless flat conveyor belts parallel to each other and positioned vertically of, and closely adjacent, the upper run of the first-mentioned conveyor belt.

5. An apparatus according to claim 1, in which said conveying mechanism comprises a plurality of U-shaped elements arranged side by side to form an endless loop.

6. An apparatus according to any of the preceeding claims, in which both of said blades are serrate.

* * * * *